UNITED STATES PATENT OFFICE.

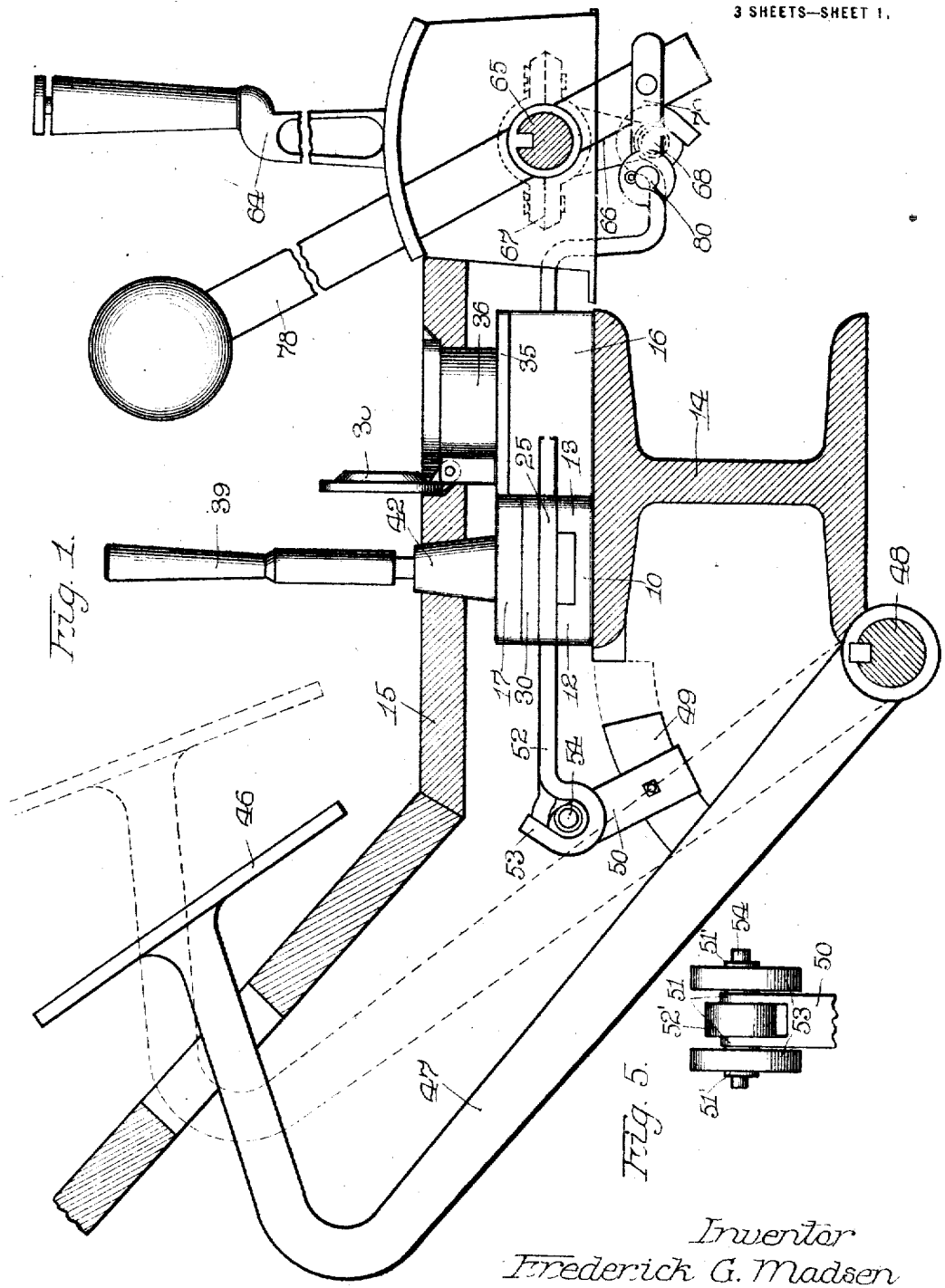

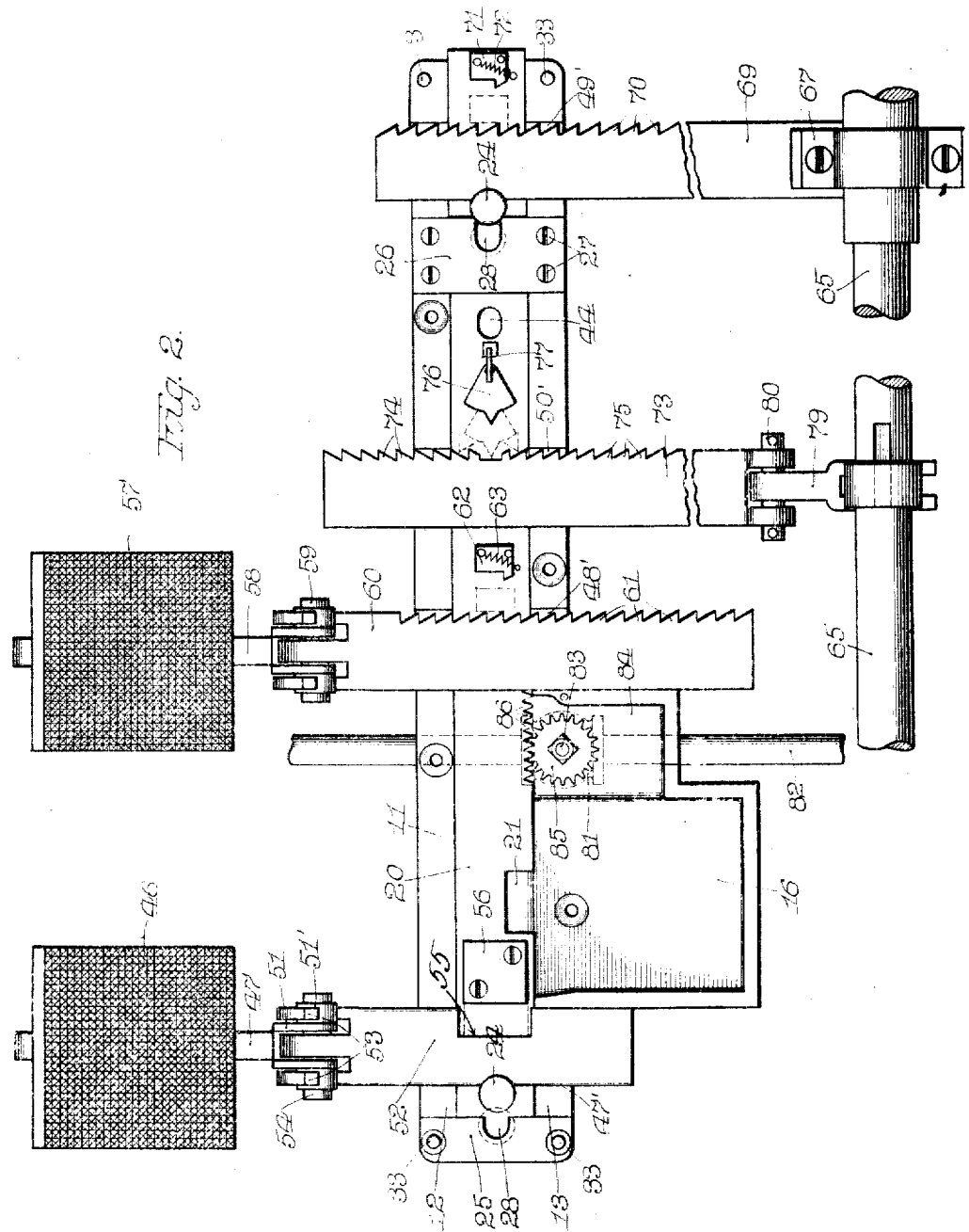

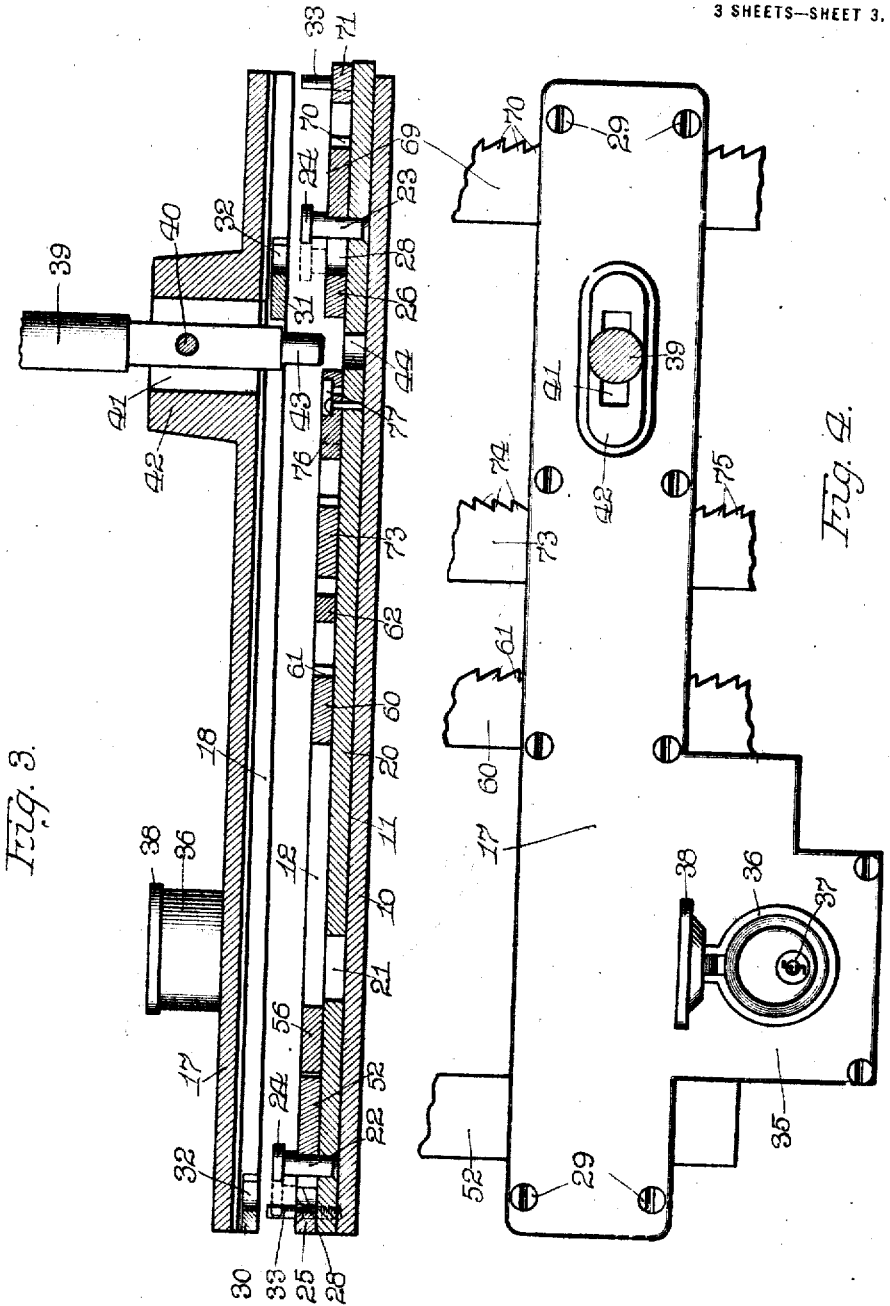

FREDERICK GARFIELD MADSEN, OF CHICAGO, ILLINOIS, ASSIGNOR OF ONE-THIRD TO ABRAM E. MABIE, OF EVANSTON, ILLINOIS, AND ONE-THIRD TO JOSEPH O. THOMAS, OF CHICAGO, ILLINOIS.

AUTOMOBILE-LOCK.

1,272,072.   Specification of Letters Patent.   Patented July 9, 1918.

Application filed January 19, 1917. Serial No. 143,297.

*To all whom it may concern:*

Be it known that I, FREDERICK GARFIELD MADSEN, a citizen of the United States, residing at Chicago, in the county of Cook and State of Illinois, have invented a certain new and useful Improvement in Automobile-Locks, of which the following is a full, clear, concise, and exact description, reference being had to the accompanying drawings, forming a part of this specification.

The present invention relates to the art of locks and latches and has particular reference to new and useful improvements in that class of locks known as automobile locks, the device having as its primary object the provision of a lock whereby all of the control levers of a motor vehicle may be securely locked against unauthorized manipulation thereby preventing theft of an automobile.

Another object of my invention is to provide a device of the character described which may be applied to any of the existing standard types of automobiles without material alteration of the structure of the same, the device being simple in construction, economical to maintain and effective and unfailing in operation.

A further object of my invention is to provide a device of the class described which may be cheaply manufactured and installed and is not subject to tampering.

Other objects and advantages not hereinbefore set forth will appear from the following detailed description and claims, taken with an inspection of the accompanying drawings, in which—

Figure 1 is a side elevational view of a lock embodying the improvements of my invention, the same being shown installed for use;

Fig. 2 is a top plan with the cover plate of the lock removed;

Fig. 3 is a longitudinal sectional view of the lock frame and cover plate therefor, the latter being removed; and Fig. 4 is a top plan of the lock assembled.

Fig. 5 is a fragmental elevation of a pivotal connection employed in my device.

Referring more particularly to the drawings, wherein similar characters of reference designate like and corresponding parts throughout the various views, 10 designates the base frame of my improved lock, the same being provided with a longitudinal channel 11, forming side walls 12 and 13. The base frame 10 is adapted to be installed on a transverse I-beam 14 forming a part of the motor vehicle chassis, said frame 10 being disposed below the floor 15 adjacent the driver's seat.

The base frame 10 is provided with a lock housing 16, preferably cast integrally therewith and extending laterally therefrom. A cover plate 17 is provided, said plate being complemental in shape to the frame 10. The cover plate is provided on its under surface with a longitudinal channel 18, said channel being complemental to the channel 11 in the frame 10 whereby to form, when said plates are coupled, a longitudinal aperture.

A latch bar 20 is slidably mounted in the channel 11 of the frame 10, said latch bar having a recess 21 in the margin thereof adjacent the lock housing 16 in order to permit engagement of the lock bolt (not shown) therewith. The latch bar 20 carries a pair of vertically extending pins 22 and 23 provided with heads 24. Transversely arranged blocks 25 and 26 are mounted upon the walls 12 and 13 of the frame 10, screws 27 or the like serving to maintain said blocks rigidly in position. The blocks 25 and 26 are provided with recesses 28 opening toward the pins 22 and 23 and adapted to receive said pins when the latch bar is slid longitudinally. A plurality of screws 29 or the like serve to retain the top plate 17 on the frame 10 and in order to prevent removal of the plate 17 when the latch bar is in retaining position, I provide a pair of blocks 30 and 31 arranged in alinement with the blocks 25 and 26 hereinbefore described. The blocks 30 and 31 are provided with recesses 32 complemental to the recesses 28 hereinbefore referred to. However, the blocks 30 and 31 are spaced from the bottom of the channel 18 in the plate 17 sufficiently to permit the heads 24 of the pins 22 and 23 to engage therebetween.

The grooves 28 and 32 being in alinement it will be apparent that when the latch bar is moved into retaining position the heads 24 of the pins 22 and 23 will engage the blocks 30 preventing removal of the plate 17 even after the screws 29 have been extracted. Dowel pins 33 are carried by the walls 12 and 13 of the base frame 10 and are adapted to engage in complementally formed openings in the cover plate 17.

The lock employed may be any standard type of sliding bolt lock, the cover plate 17 being provided with a secondary cover plate 35 for disposition over the housing 16. The plate 35 is provided with a circular enlargement 36 serving as a keyhole guard, the key receiving member or the like projecting into the circular enlargement 36 and being designated 37. The circular enlargement 36 is adapted to project through a suitable opening in the floor 15, a cover plate 38 being provided therefor when the same is not in use.

The latch bar 20 is moved longitudinally by means of a lever 39, said lever being pivotally mounted at 40 in a recess 41 formed in an enlargement 42 cast integrally with and projecting upwardly from the cover plate 17. The lower end of the lever is cylindrically formed as at 43 to engage in an opening 44 provided in the latch bar 20. When the cover plate is placed in position on the frame 10 the cylindrical portion of the lever 39 engages in the opening 44 so that oscillation of the lever will reciprocate the latch bar for purposes which will hereinafter appear.

The latch bar 20 is designed to restrain movement of a plurality of members embodying the control system or mechanism of the motor vehicle, namely, the clutch lever, foot brake, gear shifting lever and the emergency brake, the restraining elements of which are mounted in recesses 47′, 48′, 49′ and 50′, arranged in pairs in the walls 12 and 13 of the base frame 10. The clutch pedal is designated 46 and is of the usual type carried by the free end of an arm 47 keyed to a rotatable shaft 48 which is connected in any desired manner with the clutch mechanism. It is intended that the latch bar should lock the clutch lever when the clutch is in the in or operative position,— in other words, the position indicated in the dotted lines in Fig. 1. In automobile practice the clutch pedal is released as a general rule to permit engagement of the clutch element. The clutch pedal is locked or retained in position such that the clutch is connected to prevent starting of the engine if the gears are out of neutral and to prevent shifting of the gears. I accomplish this by means, together with the latch bar hereinbefore described, comprising an extension 49 having an arm 50 thereon. As best shown in Fig. 5, the arm 50 is bifurcated as at 51, the opposite side thereof being formed with alined hollow trunnions 51′. The free end of the tumbler 52 is divided into three spaced tongues, the central tongue 52′ being rolled to provide a bearing portion in alinement with the hollow trunnions 51′. The remaining tongues 53 are bent to embrace the hollow trunnions 51′, the latter forming bearings therefor. A pin 54 extends through the trunnions and through the rolled tongue 52′ to form a bearing therefor. It will be seen that when the arm 50 and tumbler 52 are connected in this manner that disconnection of the same is impossible even though the pin 54 were knocked out. When assembling the tumbler is reversed, connected to the trunnions 51′ and then turned over to the proper position for use, whereupon the connection is made. This connection is employed at all parts of the mechanism as will hereinafter appear. One side margin of the tumbler 52 is provided with a recess 55 adapted to receive a block 56 carried by the latch bar 20 when said bar is moved into the dotted position as indicated by the pins in Fig. 3. However, it will be seen that in order to bring the recess 55 into position to receive the block 56 the pedal 46 must be in retracted position. The clutch is held in engaging position by the block 56 which engages the recess 55 so that the clutch is locked.

The foot brake pedal is designated 57 and is of the same construction as that of the clutch pedal 46, being pivoted in substantially the same manner. The arm 58 of the clutch pedal 57 is pivotally connected at 59 to a sliding tumbler 60 similar to the tumbler 52 hereinbefore described. However, this tumbler 60 is provided with ratchet teeth 61 along one margin thereof to be engaged by the pivoted pawl 62 maintained in the position shown in Fig. 2 by means of a spring 63. The tumbler 60 is slidably mounted in the pair of recesses 48′ hereinbefore described. When the brake pedal 57 is depressed into the braking position and the pawl 62 engaged with the teeth 61, said brake pedal will be restrained from returning to normal released position. The pawl 62 after engaging the tumbler 60 will permit the brake to be moved to the braking position but will not permit release of the same until the latch bar is slid to the released position.

The emergency brake lever is of the usual construction and is designated 64, the same being pivoted for free movement on a rod 65 arranged parallel to the frame 10. An extension arm 66 is clamped as at 67 to the lever 64, the lower end of said arm being pivotally connected at 68 to the free end of a tumbler 69. The tumbler 69 is, at its pivot point, constructed substantially like the tumblers 52 and 60, hereinbefore referred to only inverted relative thereto. One margin of the tumbler 69 is provided with a plurality of ratchet teeth 70 similar to the teeth 61 on the tumbler 60, said teeth 70 being adapted for engagement with a pivoted pawl 71, said pawl automatically engaging the teeth by means of the spring 72. The pawls 62 and 71 are practically identical in construction, and their operation is identical, the direction of movement of the tumblers merely being reversed, therefore, a detailed description of the operation of the tumbler 69 need not be herein embodied. The tumbler 69 slides in the recesses 49'.

It will be noted that each of the tumblers 52, 60 and 69 have a one-way movement, that is, to lock the piece of mechanism to which the same is connected, the tumbler need be moved in but a single direction. However, in the gear-shifting lock it is necessary that movement in both directions be arrested when movement in either direction has been once started. Therefore, a tumbler 73 having a double set of oppositely arranged ratchet teeth 74 and 75 along one margin thereof is provided. The tumbler 73 is operable in a pair of recesses 50' formed in the walls 12 and 13 of the base 10. A double acting pawl 76 is arranged on the latch bar 20 to engage the teeth 74 and 75, said pawl being carried by the free end of a flat spring 77, the opposite end of the flat spring being anchored to the latch bar. The gear shifting lever is designated 78 and is of any standard make, the same being pivotally mounted on the rod 65 hereinbefore referred to. A link 79 connects the lower free end of the gear shifting lever 78 to the free end of the tumbler 73, as indicated at 80.

The pawl 76 will permit movement of the gear shifting lever 78 into the forward or reversed position but will not permit return of the lever until the latch bar is unlocked.

Means is also provided whereby to shut off the fuel supply when the levers described are locked, said means including any ordinary turning plug valve 81 interposed in the fuel line conduit 82 and having the stem 83 thereof projecting into an enlargement 84 formed on the housing 16. A pinion 85 is carried by the upper end of the stem 83 and is engageable with ratchet teeth 86 formed on the adjacent margin of the latch bar 20. Thus it will be seen that movement of the latch bar into one or the other of its two positions will either open or close the valve as required.

It will, of course, be readily apparent that the ignition system of the motor vehicle may be provided with a main switch connected with the pinion 85, whereby the ignition circuit may be broken simultaneously with the shutting off of the gas or fuel supply.

The operation of my improved automobile lock is as follows:

When the motor vehicle is stopped the emergency brake lever is pulled back to the applied position in the usual manner. The clutch pedal is left in the connected position and the lever 39 moved to slide the block 56 into engagement with the recess 55 in the tumbler 52 connected with said pedal. This movement of the latch bar 20 shuts off the gas or fuel supply and, if desired, cuts off the ignition circuit. The pawls 62, 71 and 76 being carried by the latch bar are moved into position to engage the tumblers 60, 69 and 73. The foot brake pedal may be depressed to the applied position and the pawl 62 will hold said pedal in such position. The gear shift lever may be moved to the forward or reversed position, preferably the latter, and will be retained in that position by means of the pawl 76. The emergency brake lever will be held by the ratchet ordinarily used and release of the same will be prevented by the pawl 71 engaging the tumbler 69. After the latch bar has been moved to holding position, a key is inserted in the lock carried in the housing 16 and the bolt of said lock is engaged with the recess 21 formed in said latch bar. Any attempt to remove the cover plate 17 is frustrated by means of the pins 22 and 23, and the dowel pins 33 serve to prevent any endwise movement of the cover plate.

All that the owner need do on starting the car is to move the locking bar 20 to locking position whereby to lock the clutch in connected position and shut off the gasolene. This leaves the foot brake, emergency brake and gear shift levers in clear position. I do this to leave the wheels unlocked and the car movable as may be required by city ordinances or fire regulations.

However, the protection afforded is complete. If any attempt is made to tow the car away, as soon as the foot brake is applied it locks in applied position. If the gear lever is shifted it becomes locked in such position. If the emergency brake is applied it also locks in applied position.

If it is attempted to start the car under its own power the gasolene in the carbureter will soon be exhausted and the car will stop.

I believe that this general function of setting the lock such that the car is free to be moved and in which the controls are in normal position, but as soon as any attempt is made to use them they will be locked against use, is broadly new and I claim the same as such.

I desire to direct particular attention to the fact that the device of my invention is in and of itself a unit and may be applied to various types of control levers and the like by merely altering the connection between the tumblers and said levers. It will also be apparent that any number of these tumblers may be arranged in the base frame of my invention. Of course, it is not essential that all of the control levers be locked, but it is preferred that this arrangement be had which assures positive locking of the motor vehicle.

It will also be apparent that the device of my invention may be readily installed on any of the existing types of gasolene propelled vehicles and may be applied to other similar uses without material alteration of the structure.

From the above description taken in connection with the accompanying drawings, it is thought that a clear and comprehensive understanding of the construction, operation and advantages of my improved automobile lock may be readily gathered, and while I have shown and described the device as embodying a specific structure, it will be understood that I reserve the right to make such changes in said structure as do not depart from the spirit and scope of the invention as claimed.

I claim:

1. In combination, a plurality of levers, a base frame, a latch bar slidable therein, members operatively associated with the levers and arranged transversely in said latch bar, a lock for the bar, a removable cover plate for the base, and means on the latch bar engageable with the cover plate when the latch bar is in locked position to prevent unauthorized removal of said cover plate.

2. In combination, a base frame, a sliding latch bar mounted in said frame, means to lock said latch bar, a plurality of members operable transversely of the latch bar, and a plurality of pawl members on said latch bar to engage said transversely operable member to restrain movement of the same.

3. In combination, a plurality of levers or the like to be locked, a base frame, a sliding latch bar mounted in said frame, a plurality of members disposed transversely of the frame and connected with said levers, a removable cover plate, means on the latch bar to restrain the members, means to lock the latch bar, and means on said latch bar to engage and retain the cover plate when the latch bar is in locked position.

4. In combination, a plurality of levers or the like to be locked, a base frame, a sliding latch bar therein, a cover plate on said frame having a plurality of socket plates, a plurality of transverse members on said frame connected to said levers, means to shift said latch bar, and a plurality of pins on said latch bar to engage the socket plate when the latch bar is moved to locked position to prevent unauthorized removal of the cover plate.

5. In combination, a plurality of levers or the like to be locked, a base frame, a sliding latch bar therein, a plurality of transverse members on said frame connected to said levers, said transverse members having ratchet teeth and pawl members on said latch bar adapted to engage said toothed transverse members to restrain the same against movement in a single direction.

6. In combination a plurality of levers or the like to be locked and a conduit having a valve therein to be closed simultaneously with the locking of said levers, a base frame, a sliding latch bar therein, a plurality of transverse members on said frame connected to said levers, means on said latch bar to restrain said members, means to lock the latch bar, and means carried by the latch bar engageable with the valve mechanism to close the same.

7. In a device of the class described, the combination of a base frame having a longitudinal channel therein, a cover plate to be disposed on said frame provided with a channel complemental to first said channel, a latch bar slidable in the first said channel, a lock housing and a lock to engage said latch bar, a plurality of members arranged transversely to the latch bar, said base frame being provided with recesses to guide said members, means on the latch bar to engage and restrain movement of said members, socket plates on said base frame and said cover plate, a lever to shift said latch bar, valve actuating means associated with the rack bar, and a plurality of projections carried by the rack bar to engage in the socket plates on said base frame and cover plate to prevent removal of the cover plate when the latch bar is in locked position.

8. An automobile lock having means to lock one or more of the control members in engaged position and leave the others in disengaged or inoperative position, but to lock said latter members should the same be moved out of normal position.

9. An automobile lock having means operatively associated with the control members to lock the clutch in engaged position and shut off the fuel supply, said means engaging the other control members should the same be moved in normal operation.

10. In an automobile lock, the combination of means to shut off the fuel supply and lock one of the control elements in operative position, said means being engageable with the other control members when the same are moved in normal operation.

11. In combination, a plurality of levers controlling a clutch, gear mechanism and a brake, a base having a latch bar slidable therein, a plurality of members connected to said levers and disposed transversely in said latch bar, means on the latch bar to positively restrain the clutch lever and additional means on the latch bar to permit limited movement of the other levers.

In witness whereof I hereunto subscribe my name this 17th day of January, A. D. 1917.

FREDERICK GARFIELD MADSEN.